United States Patent
Vasseur et al.

(10) Patent No.: US 11,425,009 B2
(45) Date of Patent: Aug. 23, 2022

(54) NEGOTIATING MACHINE LEARNING MODEL INPUT FEATURES BASED ON COST IN CONSTRAINED NETWORKS

(71) Applicant: Cisco Technology, Inc., San Jose, CA (US)

(72) Inventors: Jean-Philippe Vasseur, Saint Martin d'uriage (FR); Pascal Thubert, Roquefort les Pins (FR); Eric Levy-Abegnoli, Valbonne (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 236 days.

(21) Appl. No.: 16/709,235

(22) Filed: Dec. 10, 2019

(65) Prior Publication Data
US 2021/0176146 A1     Jun. 10, 2021

(51) Int. Cl.
*H04L 43/062* (2022.01)
*G06N 5/04* (2006.01)
(Continued)

(52) U.S. Cl.
CPC .............. *H04L 43/062* (2013.01); *G06N 5/04* (2013.01); *G06N 20/00* (2019.01);
(Continued)

(58) Field of Classification Search
CPC .......... G06N 5/04; G06N 20/00; G06N 5/003; G06N 3/04; G06N 7/005; H04L 41/0631; H04L 41/0826; H04L 41/0853; H04L 41/145; H04L 41/147; H04L 43/062; H04L 43/08
See application file for complete search history.

(56) References Cited

U.S. PATENT DOCUMENTS 9,521,158 B2    12/2016   Di Pietro et al.
10,607,155 B2 *   3/2020   Shen ...................... H04L 67/10
(Continued)

OTHER PUBLICATIONS

Zhu, P. et al., "Cost Aware Inference for IoT Devices", 22nd International Conference on Artificial Intelligence and Statistics (AISTATS) 2019, Apr. 1, 2019, 10 pages.
(Continued)

*Primary Examiner* — Thomas J Dailey
(74) *Attorney, Agent, or Firm* — Behmke Innovation Group LLC; Kenneth J. Heywood; Jonathon P. Western (57) ABSTRACT

In one embodiment, a service receives a feature availability report indicative of which telemetry variables are available at a device in a network and resource costs associated with data features that the device could compute from the telemetry variables. The service selects at least a subset of the data features for input to a machine learning model, based on their associated resource costs and on their respective impacts on one or more performance metrics for the machine learning model. The service trains the machine learning model to evaluate the selected data features. The service sends the trained machine learning model to the device. The device computes the selected data features from the telemetry variables available at the device and uses the computed data features as input to the machine learning model.

20 Claims, 5 Drawing Sheets

(51) Int. Cl.

| | |
|---|---|
| *G06N 20/00* | (2019.01) |
| *H04L 41/0826* | (2022.01) |
| *H04L 41/0853* | (2022.01) |
| *H04L 41/14* | (2022.01) |
| *H04L 43/08* | (2022.01) |
| *H04L 41/0631* | (2022.01) |
| *H04L 41/147* | (2022.01) |
| *G06N 3/04* | (2006.01) |
| *G06N 5/00* | (2006.01) |
| *G06N 7/00* | (2006.01) |

(52) U.S. Cl.
CPC ...... *H04L 41/0826* (2013.01); *H04L 41/0853* (2013.01); *H04L 41/145* (2013.01); *G06N 3/04* (2013.01); *G06N 5/003* (2013.01); *G06N 7/005* (2013.01); *H04L 41/0631* (2013.01); *H04L 41/147* (2013.01); *H04L 43/08* (2013.01)

(56) References Cited

U.S. PATENT DOCUMENTS

| | | | |
|---|---|---|---|
| 10,959,290 B1* | 3/2021 | Bhattacharyya | H04L 41/16 |
| 11,018,959 B1* | 5/2021 | Neill | H04L 43/04 |
| 11,029,972 B2* | 6/2021 | Vichare | G06F 9/44505 |
| 2006/0100969 A1* | 5/2006 | Wang | G06F 16/24542 705/400 |
| 2015/0195146 A1* | 7/2015 | Di Pietro | G06N 3/02 370/230 |
| 2017/0187588 A1* | 6/2017 | Nolan | H04L 43/02 |
| 2017/0230410 A1* | 8/2017 | Hassanzadeh | G06N 20/00 |
| 2019/0220703 A1 | 7/2019 | Prakash et al. | |

OTHER PUBLICATIONS

Thomas, A. et al., "Hierarchical and Distributed Machine Learning Inference Beyond the Edge", IEEE 16th International Conference on Networking, Sensing and Control (ICNSC)—2019, Jun. 24, 2019, 6 pages.

Mari, Roberto, "Machine Learning on Telemetry Data: Mining Value from Chaos", https://www.networkcomputing.com/, Aug. 9, 2019, 3 pages.

Bormann, C. et al., "Terminology for Constrained-Node Networks", Internet Engineering Task Force (IETF), May 2014, 18 pages.

Brownlee, Jason, "Feature Importance and Feature Selection With XGBoost in Python", Machine Learning Mastery, Aug. 31, 2016, 26 pages.

* cited by examiner

NEGOTIATING MACHINE LEARNING MODEL INPUT FEATURES BASED ON COST IN CONSTRAINED NETWORKS

TECHNICAL FIELD

The present disclosure relates generally to computer networks, and, more particularly, to negotiating machine learning model input features based on cost in constrained networks.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room.

With the recent proliferation of machine learning techniques, new opportunities have arisen with respect to monitoring a network. Indeed, machine learning has proven quite capable of analyzing complex network patterns and identifying problems that might otherwise be missed by a network administrator. In some cases, a machine learning-based network assurance system may even be able to predict problems before they occur, allowing for corrective measures to be taken in advance.

Unfortunately, applying machine learning to an IoT network presents many challenges that are not present in traditional networks. Indeed, many IoT networks are constrained in terms of their available resources and exhibit lossy links, low bandwidth, battery operation, low memory and/or processing capability of the device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to the IoT.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a service receives a feature availability report indicative of which telemetry variables are available at a device in a network and resource costs associated with data features that the device could compute from the telemetry variables. The service selects at least a subset of the data features for input to a machine learning model, based on their associated resource costs and on their respective impacts on one or more performance metrics for the machine learning model. The service trains the machine learning model to evaluate the selected data features. The service sends the trained machine learning model to the device. The device computes the selected data features from the telemetry variables available at the device and uses the computed data features as input to the machine learning model.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
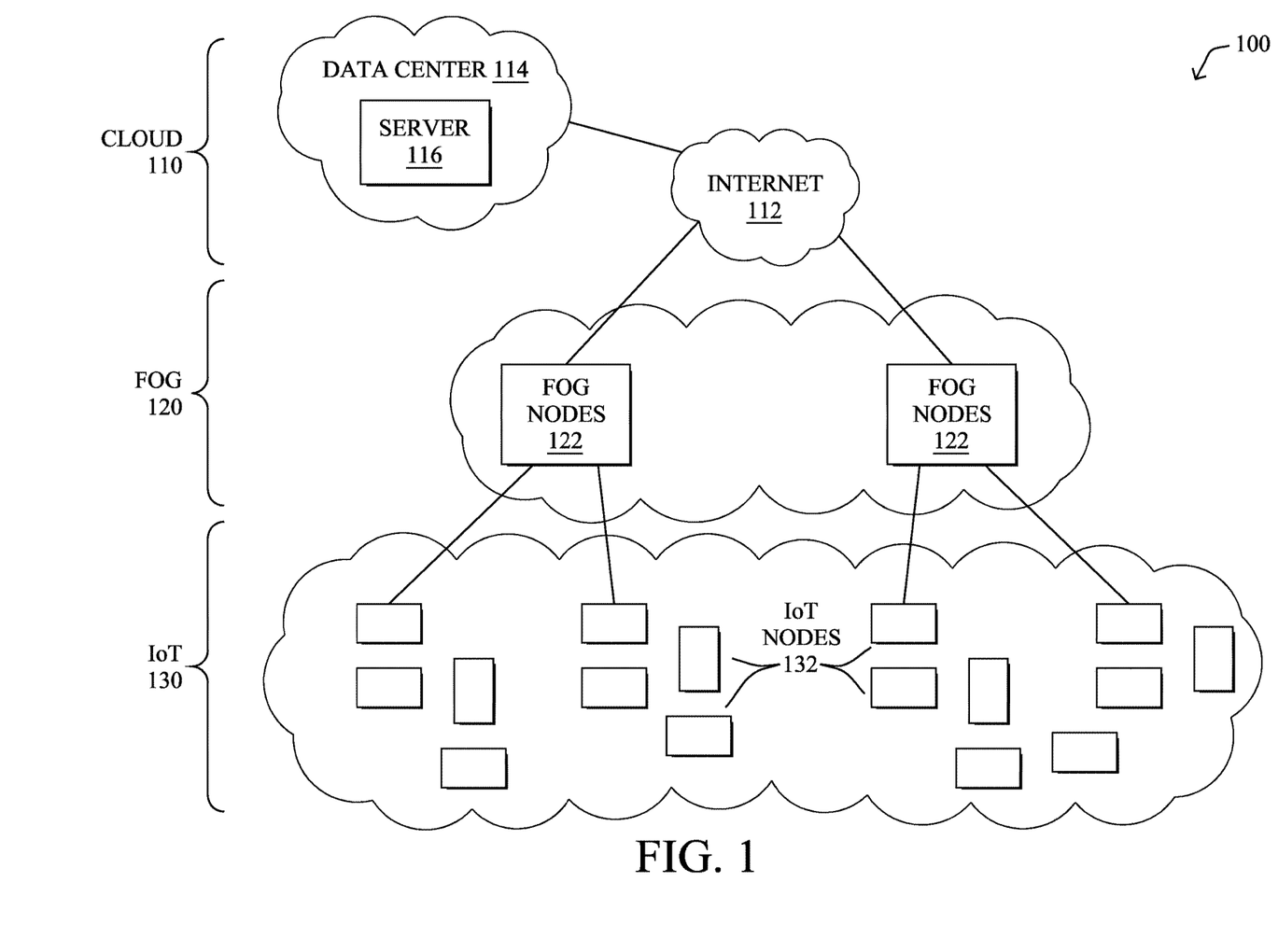
FIG. 1 illustrate an example network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, fog layer 120, and IoT device layer 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
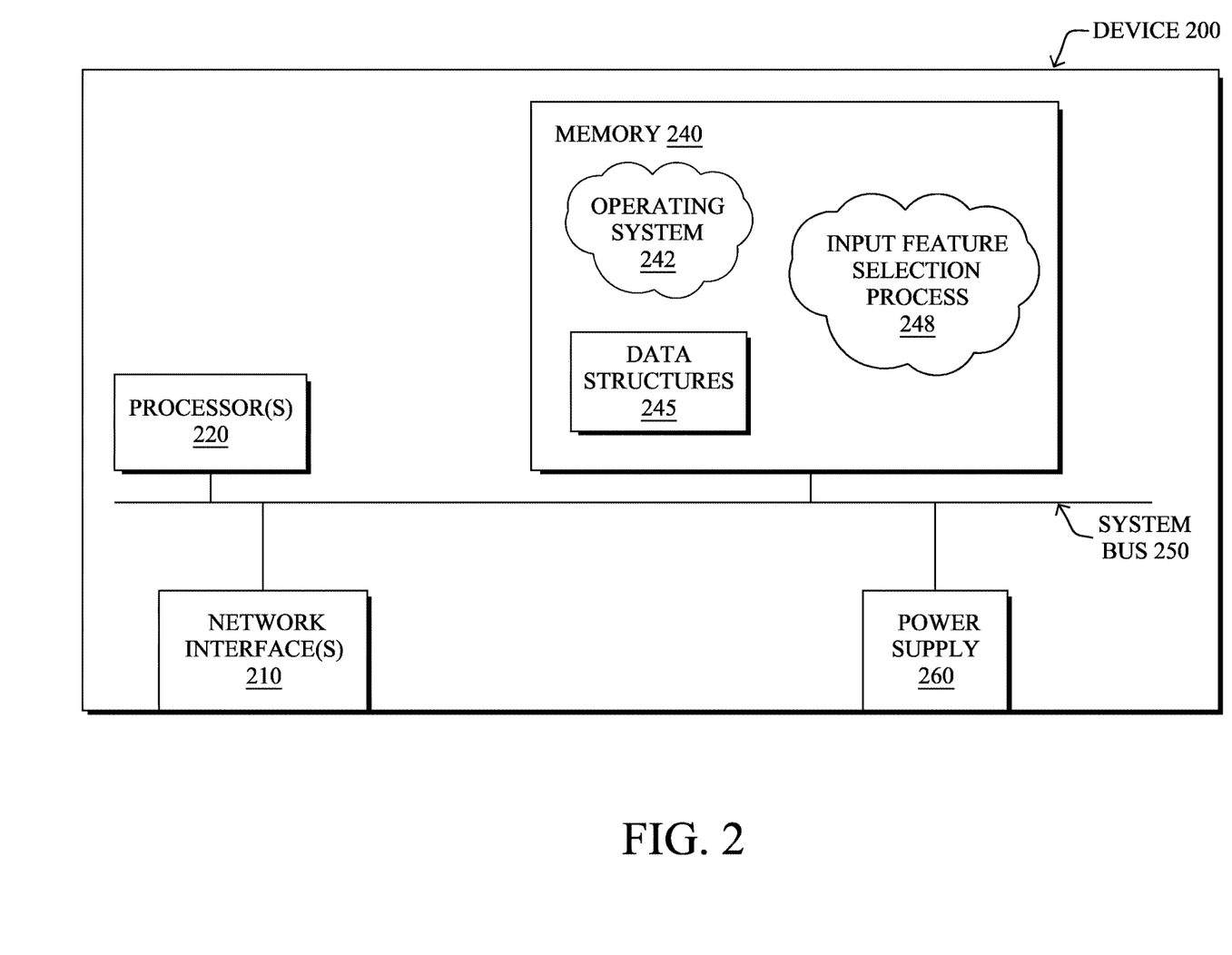
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below.

The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative input feature selection process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
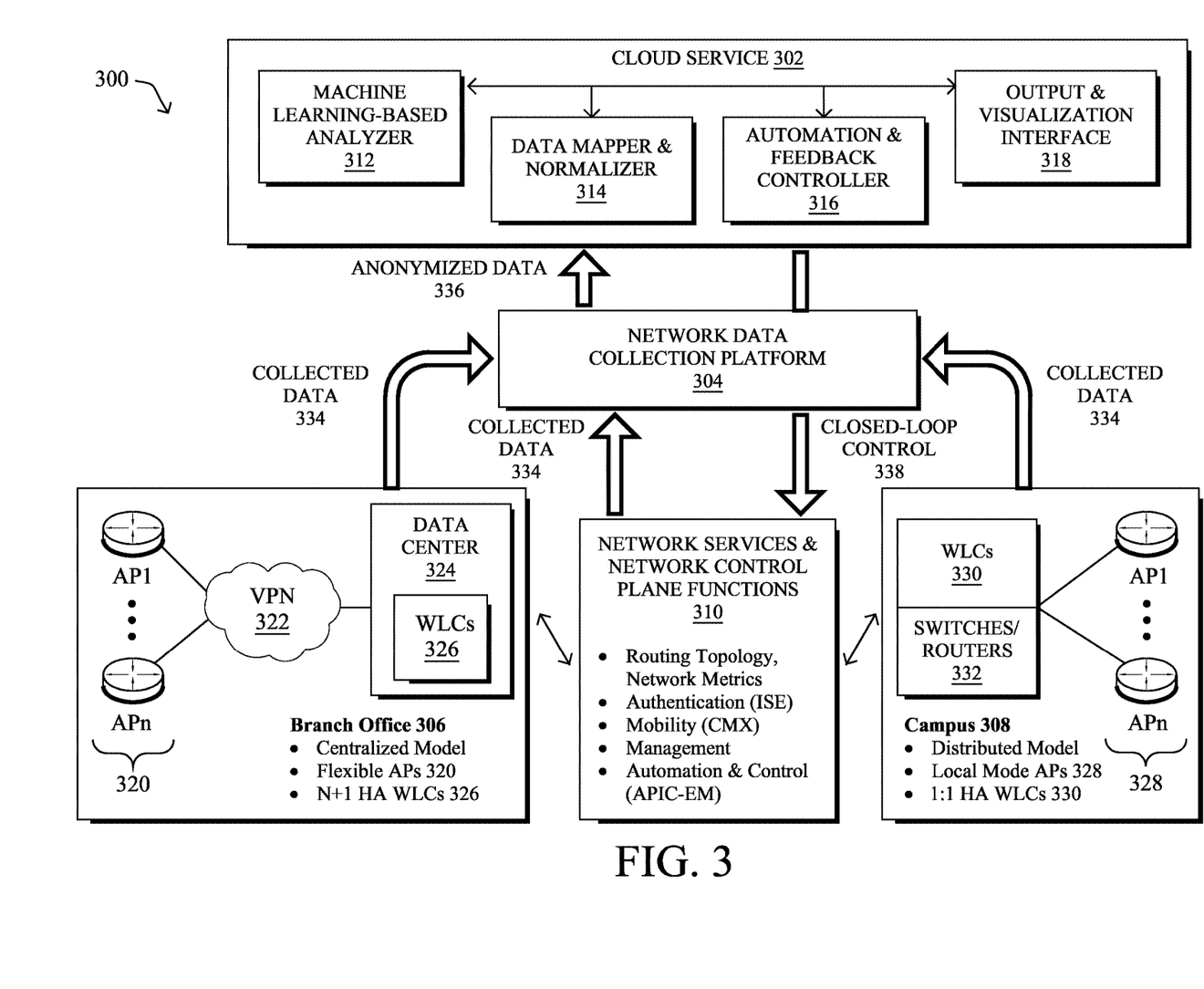
FIG. 3 illustrates an example network assurance system.

FIG. 3 illustrates an example network assurance system 300 that uses machine learning to monitor a network, according to various embodiments. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

As shown, at the core of network assurance system 300 may be a cloud-based network assurance service 302 that leverages machine learning in support of cognitive analytics for the network, predictive analytics (e.g., models used to predict user experience, etc.), troubleshooting with root cause analysis, and/or trending analysis for capacity planning. Generally, network assurance system 300 may support monitoring for both wireless and wired networks, as well as LLNs/IoT networks.

In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance system 300 may employ one or more supervised, unsupervised, or semi-supervised machine learning models. Generally, supervised learning entails the use of a training set of data, as noted above, that is used to train the model to apply labels to the input data. For example, the training data may include sample vibration measurement data that has been labeled as indicative of a structural anomaly. On the other end of the spectrum are unsupervised techniques that do not require a training set of labels. Notably, while a supervised learning model may look for previously seen patterns that have been labeled as such, an unsupervised model may instead look to the underlying patterns of the data, such as how sets of vibration measurements are inter-related and/or change over time. Semi-supervised learning models take a middle ground approach that uses a greatly reduced set of labeled training data.

Example machine learning techniques that network assurance service 300 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression techniques, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), deep learning, random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted or inferred that a problem exists in the network. Conversely, the false negatives of the model may refer to the number of times the model failed to detect such a problem. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc.). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, the proliferation of machine learning techniques presents new opportunities with respect to monitoring a network. Indeed, machine learning has proven quite capable of analyzing complex network patterns and identifying problems that might otherwise be missed by a network administrator. In some cases, a machine learning-based network assurance system may even be able to predict problems before they occur, allowing for corrective measures to be taken in advance.

In some cases, it may be desirable to deploy a machine learning model for execution directly on a device in the network, as opposed to providing data to the cloud for analysis. This is particularly true in constrained networks, where it may be impossible to reliably communicate the telemetry data for analysis and/or may consume precious bandwidth in the network.

However, IoT devices, and Wi-Fi IoT devices in particular, are generally battery-powered and lack special hardware for running highly complex numerical transformations, which would be needed to execute a typical machine learning model. Notably, many such battery-powered devices are equipped with lower capability processors and a limited amount of memory, to help conserve power consumption, as even refreshing memory consumes power.

Negotiating Machine Learning Model Input Features Based on Cost in Constrained Networks The techniques herein introduce a collaborative process whereby a central service computes a machine learning model for execution on a device in a constrained network. In some aspects, the device may provide a feature availability report to the service that specifies the resource costs associated with computing different data features from telemetry variables available to the device. For example, such a report may indicate the resource costs associated with the device collecting the telemetry variables and/or computing the feature data from the collected telemetry variables. In further aspects, the service computes a model for execution on the device based on the report from the device and on the 'importance' of each feature on the performance of the model. In another aspect, this process may be repeated any number of times, allowing the service to adjust the set of features evaluated by the model over time (e.g., to account for decreased resource availability on the device, increased computational costs, etc.).

Illustratively, the techniques described herein may be performed by hardware, software, and/or firmware, such as in accordance with the input feature selection process 248, which may include computer executable instructions executed by the processor 220 (or independent processor of interfaces 210) to perform functions relating to the techniques described herein.

Specifically, according to various embodiments, a service receives a feature availability report indicative of which telemetry variables are available at a device in a network and resource costs associated with data features that the device could compute from the telemetry variables. The service selects at least a subset of the data features for input to a machine learning model, based on their associated resource costs and on their respective impacts on one or more performance metrics for the machine learning model. The service trains the machine learning model to evaluate the selected data features. The service sends the trained machine learning model to the device. The device computes the selected data features from the telemetry variables available at the device and uses the computed data features as input to the machine learning model.

Figure 4:
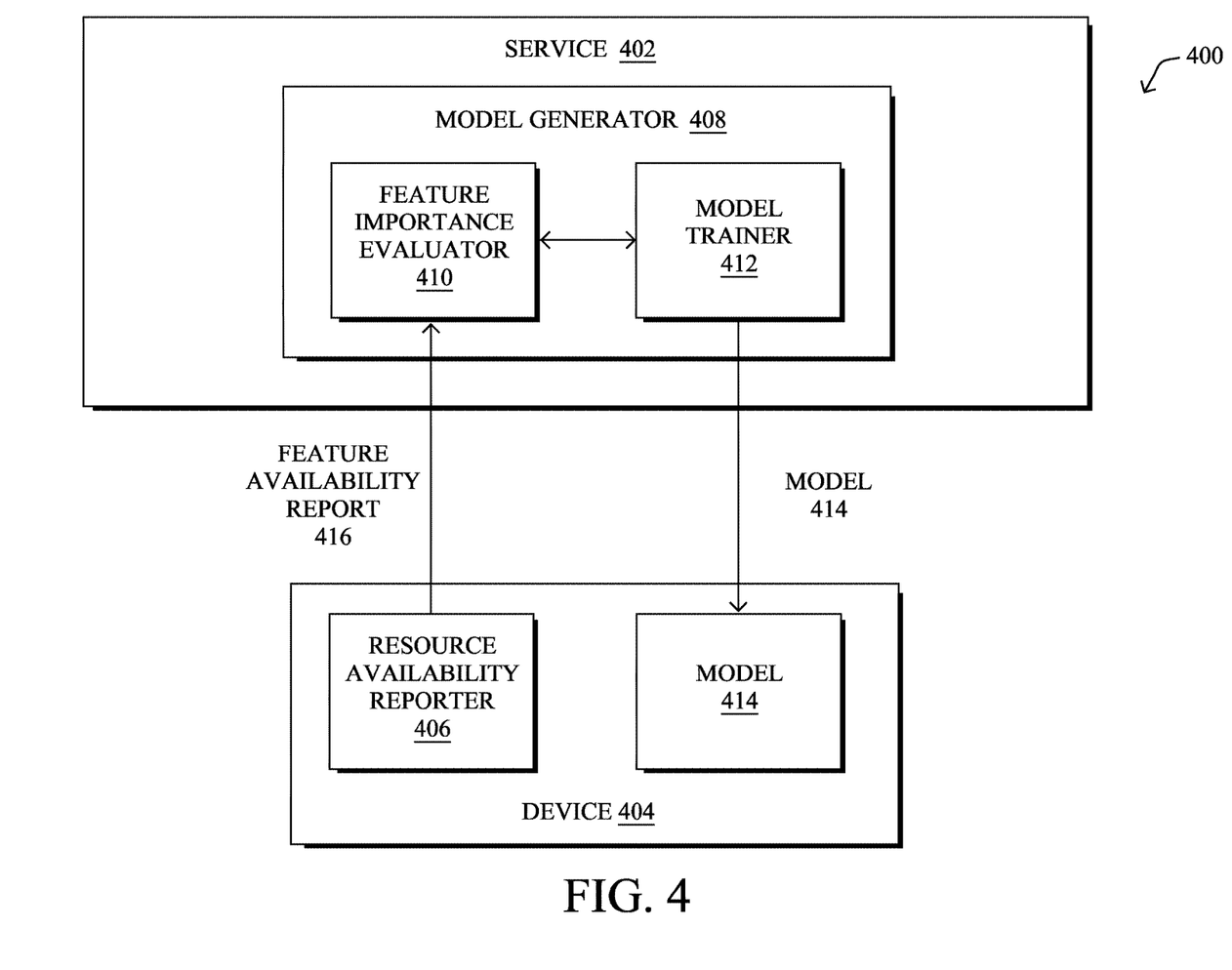
FIG. 4 illustrates an example architecture for negotiating machine learning model inputs based on cost in a constrained network.

Operationally, FIG. 4 illustrates an example architecture 400 for negotiating machine learning model inputs based on cost in a constrained network, according to various embodiments. As shown, assume that assume that there is a centralized service (e.g., cloud service 302) in communication with a device 404 located within a network. Further, assume that service 402 is to deploy a machine learning model to device 404 to make inferences locally within the network itself. For example, such a model may be configured to make a health inference about the network from the selected data features, enable device 404 to make routing decisions, allow device 404 to process sensor data and/or send control commands to an actuator as part of a control loop, etc.

According to various embodiments, architecture 400 may include resource availability reporter 406 executed by device 404 that is responsible for assessing the local resources available on device 404 (e.g., an IoT node, an AP, a switch, etc.). In one embodiment, this may entail resource availability reporter 406 identifying the telemetry variables $\{v_1, v_2, \ldots, v_n\}$ available to device 404 required to compute a set of features $\{f_1, f_2, \ldots, f_n\}$ that may be used as input to a machine learning model M whose inference takes place locally on device 404. For example, such features may comprise time series data, statistics (e.g., an average, distribution, a count, etc.), or other information that may be derived from the telemetry data. In other words, when a model is deployed to device 404, it may also perform the data mapping and normalization functions associated with the model.

Note that the computation of a feature may itself consume a non-negligible amount of resources of device 404. Indeed the model M may require device 404 to compute a complex feature $f_i$ using one or more local variables, potentially over a period of time. As the length of time increases, so too does the number of values that device 404 will need to store to compute the feature, and consuming more memory of device 404.

As shown, resource availability reporter 406 may generate a feature availability report 416 regarding the potential features that it could compute and provide report 416 to service 402 periodically, on a push or pull basis, or even when the contents of feature availability report 416 have changed by a threshold amount.

In a simple embodiment, resource availability reporter 406 may determine and include in feature availability report 416 data indicative that only a subset of the telemetry data is available on device 404. For example, because of the constrained resources of device 404, device 404 may not be able to capture certain telemetry values (e.g., ETX, RSSI, OAM path delay probe value, etc.) for a certain period of time. In this case, feature availability report 416 may indicate information such as the following:

Telemetry variable $v_i$ is not available on device 404 for the next 30 days (or some other time period)
Telemetry variable $v_j$ is not available on device 404 for an undetermined amount of time.

In various embodiments, resource availability reporter 406 may also determine and include data regarding the resource costs associated with the features. For example, assume that the model to be executed on device 404 predicts packet loss in a Wi-Fi network. If the feature computed using variable $v_i$ is too costly from a resource perspective on device 404, then the use (inference) of the machine learning model may not even be possible on device 404. For example, capturing non-linear effect on a variable using a kernel may be too computationally intensive for many constrained devices. Another frequent example is when the feature requires the extraction of a statistical moment of the distribution of the raw telemetry variables, such as the mean, max, or some percentile over a period of time, requiring memory to store data over time but also some level of computation.

Generally speaking, the resource costs associated with computing a given feature may indicate the amount of memory that such a computation would consume on device 404, the amount of processing resources that the computation would consume, an amount of battery power, traffic resources (e.g., if device 404 obtains the telemetry values from another device in the network), or the like.

In a further embodiment, the feature computation cost information included in feature availability report 416 may also indicate the resource cost associated with the collection of the telemetry variable(s) from which a given feature is computed. For example, feature availability report 416 may also include information such as the following:

Cost (variable $v_j$) is $C(v_j)$, cost (variable $v_k$) is $C(v_k)$, etc.

As shown, assume that service 402 includes a model generator 408 that is configured to generate a machine learning model for execution on device 404. To do so, generator 408 may comprise the following components: a feature importance evaluator 410 and a model trainer 412. As would be appreciated, the functionalities of feature importance evaluator 410 and model trainer 412 may be combined, omitted, or implemented in a distributed manner, as desired.

By reporting to service 402, via feature availability report 416, the availability of the features on device 404, as well as their associated resource costs, model generator 408 may use this information to optimize the generation of the model. More specifically, reporting information such as the resource costs associated with obtaining a raw variable $v_i$ and its related feature $f_j$ allows model generator 408 to use this information as an important constraint when computing the machine learning model to be executed on device 404.

According to various embodiments, feature importance evaluator 410 is configured to assign a feature importance score to each of the features reported in feature availability report 416. In general, this score quantifies how much of an impact a given feature has on the performance of the machine learning model. For example, the feature impact score of a given feature may quantify how different ranges of values for the feature and/or missing values for the feature will impact performance metrics for the model, such as its recall, precision, or the like.

As would be appreciated, feature importance evaluator 410 may assign feature importance scores to the features of feature availability report 416 in a number of ways, depending on the type of machine learning model. For example, this may be a relatively trivial task in the case of the model being a Gradient Boosted Tree (GBT), such as by computing a Gini index for each node, or the like. In another embodiment, feature importance evaluator 410 may inject noise into the feature (e.g., by randomly shuffling values, etc.) and evaluate the impact on the performance of the model. To do so, Mean Decrease Accuracy (MDA) is one such approach that feature importance evaluator 410 may employ. In further embodiments, feature importance evaluator 410 may determine how predictions of the model change when the feature is modified in some way, such as by replacing it with a sample mean, as in the case of employing a Shapley Additive exPlanations (SHAP)-based approach, or the feature is linearly perturbed, as in the case of employing a Local Interpretable Model-Agnostic Explanations (LIME)-based approach.

In various embodiments, model trainer 412 may train a model 414 for deployment to device 404 by selecting at least a subset of the available features indicated in feature availability report 416 for input to the model, so as to optimize one or more defined objectives. Model trainer 412 may make this selection based on the resource costs associated with the features, as indicated in feature availability report 416, as well as their feature importance scores, as computed by feature importance evaluator 410. For example, given a set of features $\{f_1, f_2, \ldots, f_n\}$, the set of telemetry values $\{v_1, v_2, \ldots, v_n\}$ from which the features can be computed, and their associated resource costs $\{C(f_1), C(f_2), \ldots, C(f_n)\}$, and/or $\{C(v_1), C(v_2), \ldots, C(v_n)\}$, model trainer 412 may select features for input to the model in an attempt to balance their resource costs versus their feature importance scores.

In various embodiments, model trainer 412 may select the input features for the model according to any specified objective. For example, model trainer 412 may train model 414 in accordance with any of the following strategies:

Try to minimize the overall cost of inference while achieving at least a minimum required performance for the model, such as a minimum recall and/or minimum precision, as in the case of the model comprising a classifier. A simple approach to achieve this might be for model trainer 412 to compute a model that tries to avoid using costly features by pruning features that have a relatively high resource cost and low impact score.

Try to minimize some variables/features, if their resource costs lies in the telemetry gathering process.

Try to minimize the cost of feature computation, while still using the telemetry variable associated with the feature.

By way of illustration, assume that model 414 is to detect link failures and that ten features $\{f_1, \ldots, f_{10}\}$ are available, based on a pool of thirteen telemetry variables $\{v_1, v_2, \ldots, v_{13}\}$, model trainer 412 may evaluate the feature importance of each feature $f_i$ and the resource cost associated with that feature, to determine which features should be used by the model 414. Note also that the model training process may be performed by feature importance evaluator 410 and model trainer 412 in an iterative manner, such as training a model using a certain set of features, evaluating its performance, and repeating this process until the model satisfies the desired objective.

In one embodiment, model trainer 412 may take into account all of the signaled constraints by the various devices in the network, so as to compute its own objective function (e.g., minimize the overall cost, the cost of feature computation when performing inference, etc.) while still achieving at least a threshold degree of model performance. In various embodiments, the minimum performance metrics for model 414 may be set by default at model generator 408, be specified via a user interface, or may even be signaled by device 404 itself.

Once model trainer 412 has trained model 414 according to the desired objective, service 402 may send the trained model 414 to device 404 for execution. Service 402 may also specify to device 404 which features are to be computed and used by device 404 for input to model 414, as well as any other configurations for device 404 associated with model 414 (e.g., which actions device 404 should take based on the results of model 414, etc.). In turn, device 404 may collect the telemetry variables needed to compute the selected input features for model 414, compute the input features for model 414, and use the computed features as input for model 414.

As would be appreciated, the resource costs associated with computing the features of model 414 are likely to change over time. For example, device 404 may receive a new battery, a more powerful processor, or the like. In addition, model trainer 412 may be upgraded over time to compute more efficient/optimal models. Accordingly, in various embodiments, the model training process may be repeated any number of times, such as periodically, on demand by a user interface, or in response to the detection of changes in the conditions of architecture 400. For example, if resource availability reporter 406 determines that a change has occurred in terms of which telemetry variables are available to device 404, or a change has occurred in terms of the resources available on device 404, reporter 406 may generate and send a new feature availability report 416 to service 402, initiating a recomputation of model 414.

Figure 5:
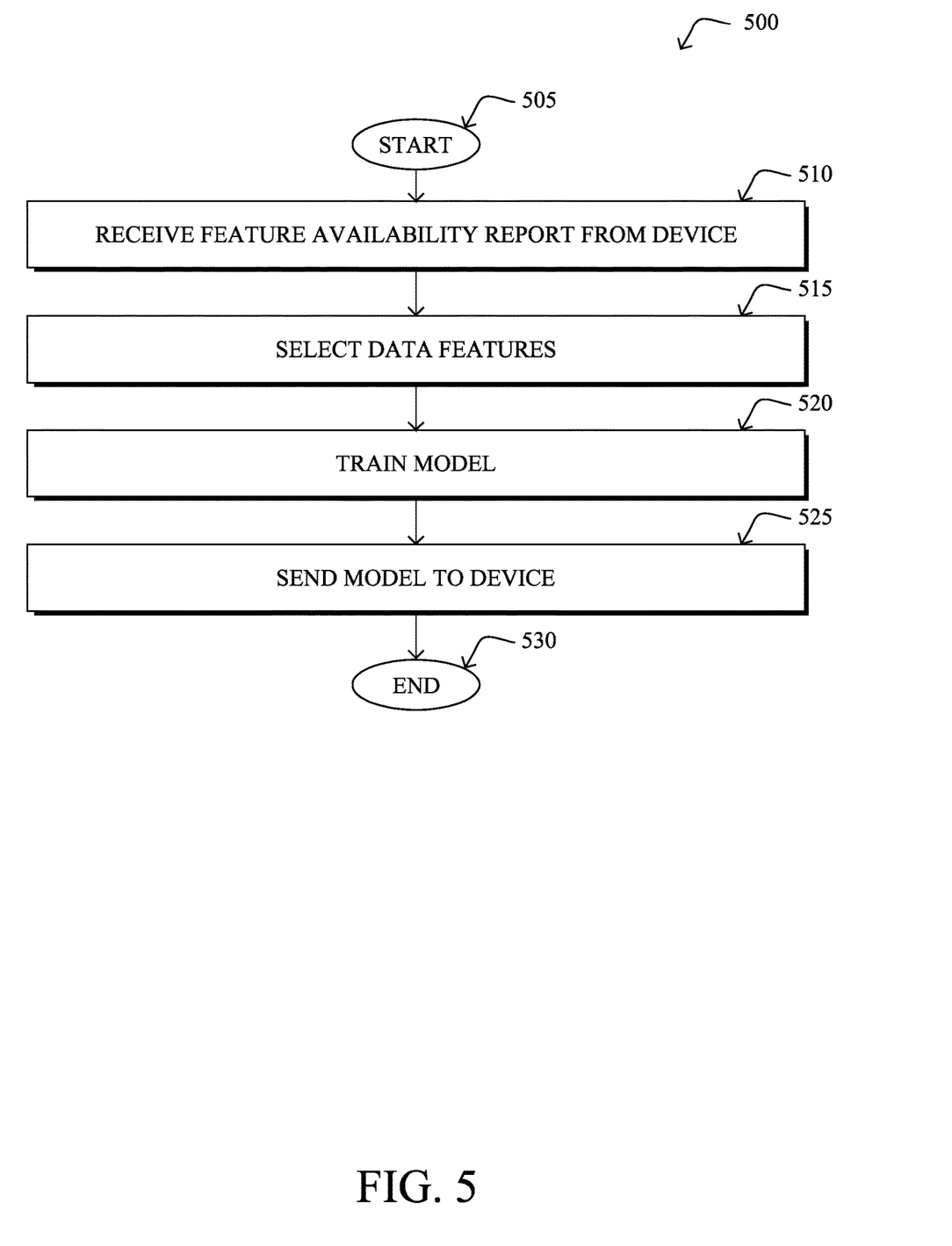
FIG. 5 illustrates an example simplified procedure for negotiating machine learning model input features based on cost.

FIG. 5 illustrates an example simplified procedure for negotiating machine learning model input features based on cost, in accordance with one or more embodiments described herein. The procedure 500 may start at step 505, and continues to step 510, where, as described in greater detail above, a service (e.g., a network assurance service, etc.) may receive a feature availability report from a device in a network. In various embodiments, the feature availability report may be indicative of which telemetry variables are available at a device in a network and resource costs associated with data features that the device could compute from the telemetry variables. In further embodiments, the report may be further indicative of available resources on the device such as its available memory, computing power, or battery life. In yet another embodiment, the report may also be indicative of the resources consumed by the device collecting the telemetry variables from which a particular data feature is computed.

At step 515, as detailed above, the service may select at least a subset of the data features for input to a machine learning model. In some embodiments, the service may base this selection on the resource costs associated with the features and on their respective impacts on one or more performance metrics for the machine learning model. For example, assume that the one or more performance metrics for the machine learning model are indicative of a recall or precision of the machine learning model. In such a case, the service may select the data features for input to the machine learning model to achieve at least a minimum recall or precision. The service may also balance the performance goals for the model against the resource costs associated with the generation of its input data features. For example, the service may prune the use of a certain data feature by the model, if computation of that feature by the device would consume a high amount of resources, but have little effect on the overall performance of the model.

At step 520, the service may train the machine learning model to evaluate the selected data features, as described in greater detail above. For example, the service may use a training dataset comprising the selected data features, to train the model for deployment to the device. The service may obtain such training data from the device itself, other devices in the network, or even similar devices in other networks, and use this training dataset to generate the model to be executed locally on the device.

At step 525, as detailed above, the service may send the trained machine learning model to the device. In turn, the device computes the selected data features from the telemetry variables available at the device and uses the computed data features as input to the machine learning model. For example, such a model may be configured to make a health inference about the network from the selected data features, make a security assessment about the device or the network, process sensor data, make control decisions for the device or another device in communication therewith, or the like. As would be appreciated, the steps of procedure 500 may be repeated any number of times, so as to dynamically adapt the model when the resources of the device change, the service is upgraded to generate more efficient machine learning models, etc. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for negotiation of machine learning feature inputs. More specifically, the techniques herein enable machine learning models to be deployed to devices in a constrained network, such that the input features for the model are selected while taking into account both the resource costs associated with the data features and their importance/influence on the performance of the model. In this way, resource consumption by the device can be minimized, while still achieving at least a minimum degree of model performance.

While there have been shown and described illustrative embodiments for negotiating machine learning feature inputs, it is to be understood that various other adaptations and modifications may be made within the intent and scope of the embodiments herein. For example, while specific models are shown herein for purposes of illustration, other models may be generated in a similar manner. Further, while the techniques herein are described as being performed by certain locations within a network, the techniques herein could also be performed at other locations, as desired (e.g., fully in the cloud, at the fog layer, fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
    receiving, at a service, a feature availability report indicative of which telemetry variables are available at a device in a network and resource costs associated with data features that the device could compute from the telemetry variables;
    selecting, by the service, at least a subset of the data features for input to a machine learning model, based on their associated resource costs and on their respective impacts on one or more performance metrics for the machine learning model;
    training, by the service, the machine learning model to evaluate the selected data features; and
    sending, by the service, the trained machine learning model to the device, wherein the device computes the selected data features from the telemetry variables available at the device and uses the computed data features as input to the machine learning model.

2. The method as in claim 1, wherein the one or more performance metrics for the machine learning model are indicative of a recall or precision of the machine learning model.

3. The method as in claim 2, wherein the service selects the data features for input to the machine learning model to achieve at least a minimum recall or precision.

4. The method as in claim 1, wherein the feature availability report is further indicative of available resources on the device comprising one or more of: available memory, computing power, or battery of the device, and wherein the service selects the data features for input to the machine learning model based further on the available resources on the device.

5. The method as in claim 1, further comprising:
    determining, by the service, the impacts of the data features on one or more performance metrics for the machine learning model by evaluating how injecting noise into each of the data features affects the one or more performance metrics for the machine learning model.

6. The method as in claim 1, wherein the resource costs associated with a particular data feature are indicative of resources consumed by the device collecting the telemetry variables from which that data feature is computed.

7. The method as in claim 1, wherein the machine learning model is configured to make a health inference about the network from the selected data features.

8. The method as in claim 1, further comprising:
    receiving, at the service, feature availability reports from the device over time; and
    dynamically adjusting which of the data features are selected for input to the machine learning model, based on the received feature availability reports.

9. An apparatus, comprising:
    one or more network interfaces to communicate with a network;
    a processor coupled to the network interfaces and configured to execute one or more processes; and
    a memory configured to store a process executable by the processor, the process when executed configured to:
    receive a feature availability report indicative of which telemetry variables are available at a device in a network and resource costs associated with data features that the device could compute from the telemetry variables;
    select at least a subset of the data features for input to a machine learning model, based on their associated resource costs and on their respective impacts on one or more performance metrics for the machine learning model;

train the machine learning model to evaluate the selected data features; and send the trained machine learning model to the device, wherein the device computes the selected data features from the telemetry variables available at the device and uses the computed data features as input to the machine learning model.

10. The apparatus as in claim 9, wherein the one or more performance metrics for the machine learning model are indicative of a recall or precision of the machine learning model.

11. The apparatus as in claim 10, wherein the apparatus selects the data features for input to the machine learning model to achieve at least a minimum recall or precision.

12. The apparatus as in claim 9, wherein the feature availability report is further indicative of available resources on the device comprising one or more of: available memory, computing power, or battery of the device, and wherein the apparatus selects the data features for input to the machine learning model based further on the available resources on the device.

13. The apparatus as in claim 9, wherein the process when executed is further configured to:

determine the impacts of the data features on one or more performance metrics for the machine learning model by evaluating how injecting noise into each of the data features affects the one or more performance metrics for the machine learning model.

14. The apparatus as in claim 9, wherein the resource costs associated with a particular data feature are indicative of resources consumed by the device collecting the telemetry variables from which that data feature is computed.

15. The apparatus as in claim 9, wherein the machine learning model is configured to make a health inference about the network from the selected data features.

16. The apparatus as in claim 9, wherein the process when executed is further configured to:

receive feature availability reports from the device over time; and dynamically adjust which of the data features are selected for input to the machine learning model, based on the received feature availability reports.

17. A tangible, non-transitory, computer-readable medium storing program instructions that cause a service to execute a process comprising:

receiving, at the service, a feature availability report indicative of which telemetry variables are available at a device in a network and resource costs associated with data features that the device could compute from the telemetry variables;

selecting, by the service, at least a subset of the data features for input to a machine learning model, based on their associated resource costs and on their respective impacts on one or more performance metrics for the machine learning model;

training, by the service, the machine learning model to evaluate the selected data features; and sending, by the service, the trained machine learning model to the device, wherein the device computes the selected data features from the telemetry variables available at the device and uses the computed data features as input to the machine learning model.

18. The computer-readable medium as in claim 17, wherein the one or more performance metrics for the machine learning model are indicative of a recall or precision of the machine learning model.

19. The computer-readable medium as in claim 18, wherein the service selects the data features for input to the machine learning model to achieve at least a minimum recall or precision.

20. The computer-readable medium as in claim 17, wherein the process further comprises:

determining, by the service, the impacts of the data features on one or more performance metrics for the machine learning model by evaluating how injecting noise into each of the data features affects the one or more performance metrics for the machine learning model.

* * * * *